United States Patent [19]

Davies

[11] 4,367,189
[45] Jan. 4, 1983

[54] BEARING

[75] Inventor: Glyndwr J. Davies, Southall, England

[73] Assignee: Associated Engineering Public Limited Company, Warwickshire, England

[21] Appl. No.: 177,766

[22] PCT Filed: Mar. 12, 1979

[86] PCT No.: PCT/GB79/00046
§ 371 Date: Nov. 7, 1979
§ 102(e) Date: Nov. 7, 1979

[87] PCT Pub. No.: WO79/00752
PCT Pub. Date: Oct. 4, 1979

[30] Foreign Application Priority Data
Mar. 13, 1978 [GB] United Kingdom ............... 9845/78

[51] Int. Cl.³ ........................................... B29D 23/12
[52] U.S. Cl. .................................... 264/137; 156/173; 156/195
[58] Field of Search ............... 264/137; 156/173, 175, 156/195

[56] References Cited

U.S. PATENT DOCUMENTS

| | | | |
|---|---|---|---|
| 3,623,930 | 11/1971 | Grosh | 156/195 X |
| 3,635,256 | 1/1972 | McLarty | 138/144 |
| 3,965,235 | 6/1976 | White | 264/137 X |
| 4,021,415 | 5/1977 | Chang | 264/137 X |
| 4,077,828 | 3/1978 | Ström | 156/175 X |
| 4,080,233 | 3/1978 | McCloskey | 264/137 X |

FOREIGN PATENT DOCUMENTS 1453289 10/1976 United Kingdom .

Primary Examiner—Thomas P. Pavelko
Attorney, Agent, or Firm—Oblon, Fisher, Spivak, McClelland & Maier

[57] ABSTRACT

This invention is a bearing tube for a marine propeller shaft, and a method of making such a tube according to which polyacrylonitrile or other fibres (8) carrying a sticky resin (7) are wound onto a mandrel (5) and, at least at the bearing lining, wear resistant powder (6) or other compound is included with the fibres and resin to improve the properties of the bearing lining. Such a bearing tube including essentially a resin impregnated polyacrylonitrile fibres and the wear resistant compound can be easily machined to size without any health hazards, and can be lubricated by oil or water (even sea water) and is dimensionally stable.

8 Claims, 2 Drawing Figures

BEARING

BACKGROUND OF THE INVENTION

1. Field of the Invention

This invention relates to plain bearings and methods of making them, and one object is to provide a method of making an improved marine stern tube bearing.

2. Description of the Prior Art

Such bearings have been manufactured in the past from asbestos yarn impregnated with a resin, but that material has not been easily machined to fit the shaft with which it is to be used, and in any case it is undesirable to use asbestos in machining operations.

SUMMARY OF THE INVENTION

According to the present invention in a method of making a bearing tube, fibre carrying a sticky resin, is wound on a former and a wear resistant compound is added to the sticky resin, and then the resin is caused or allowed to solidfy.

The fibre which may be in the form of a number or bunch of fibres, possibly of polyacrylonitrile, can be passed through a bath containing the resin, for example an epoxy, phenolic, polyester, or cresylic, resin, and wound around the former so that the resin will cause the fibres to stick together to build up the complete bearing which is conveniently in the form of a tube. If the wear resistant compound is added at the point of winding of the resin-carrying fibre, for example, in the form of a powder, which may includes one or more of the components P.T.F.E. (polytetrafluoroethylene), graphite and bronze, the wear resistant compound will be carried into the body of the tube, and thus will be well distributed throughout the body of the tube, and leaves a tube which can be effectively machined to size while still leaving a good finish.

It is of course also possible for the wear resistant compound, possibly in the form of a powder, to be included with the resin in the bath, but then the compound may not be added uniformly as the fibre is wound, and so it is preferred that the compound is added in powder form at a controlled rate at the point of winding so that the addition will be at a uniform rate.

A preferred wear resistant compound includes between 50% and 70% by volume of P.T.F.E., between 10% and 30% by volume of graphite, and between 10% and 30% by volume of bronze, or of tin/bronze.

The invention includes a bearing including wound fibres bonded together by a resin which incorporates a wear resistant compound, conveniently the compound being in particle or powder form, substantially evenly distributed throughout at least the part of the bearing adjacent a bearing surface.

The amount of the wear resistant compound is conveniently between 5% and 20% by volume of the bearing material which itself includes between 30% and 70% by volume of the sticky resin, and between 20% and 60% by volume of the fibre. The fibre can, for example, be polyacrylonitrile fibre sold under one of the Trade Marks "Courtelle", "Acrilan", and "Orlon".

One advantage of the bearing described is that it is resistant to oils and sea water without undue swelling.

BRIEF DESCRIPTION OF THE DRAWINGS

The invention may be carried into practice in various ways, and one embodiment will now be described by way of example with reference to the accompanying drawings; of which.

DETAILED DESCRIPTION OF THE PREFERRED EMBODIMENTS

Figure 1:
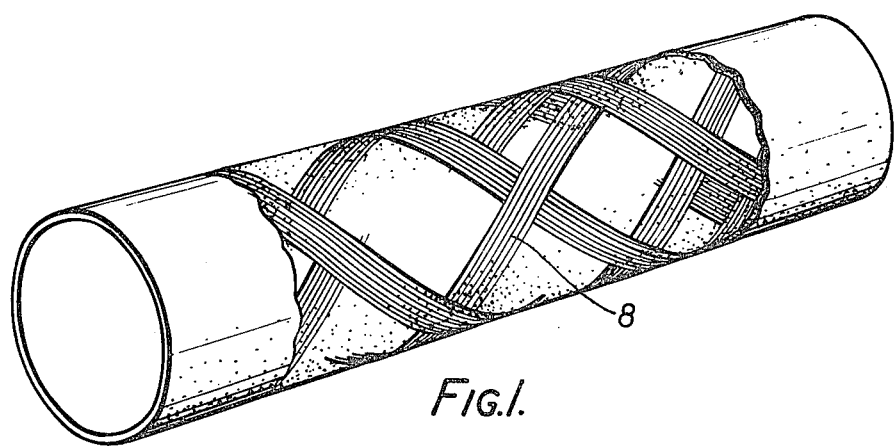
FIG. 1 is a sketch with parts cut away of a stern tube bearing made in accordance with the invention for a marine propeller shaft.
Figure 2:
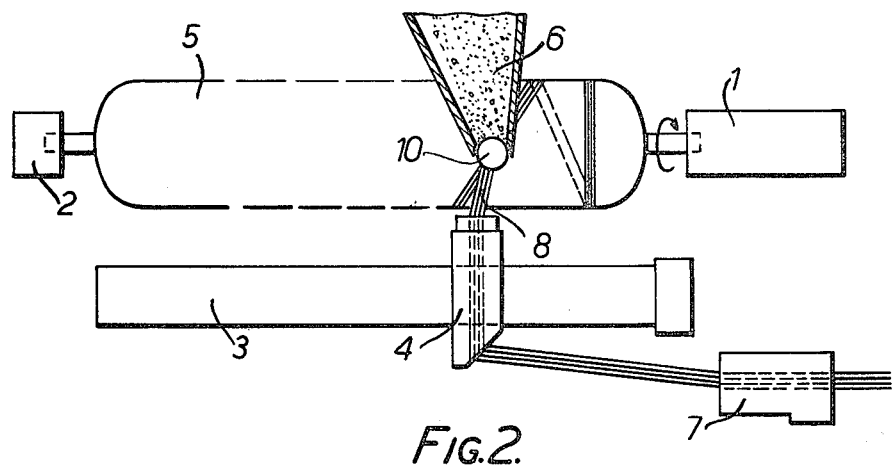
FIG. 2 is a sketch showing the tube of FIG. 1 being made.

Referring first to FIG. 2, it can be seen how a mandrel or former 5, supported by a tail stock 2, is rotated by a motor and head stock 1, while fibres 8 are wound around the former. The fibres 8 first pass through a bath 7 of a sticky resin, and then, covered with the sticky resin, are led through a guiding head 4 to a point adjacent the surface of the rotating former. The head 4 is reciprocated along a guide 3 in synchronism with the rotation of the former from the head stock 1, so that the bundle or web of fibres 8 are wound in a desired wave form, as indicated generally in FIG. 1.

Immediately after the fibres have been laid on the former, wear resistant powder is applied to the newly wound resinous fibre from a hopper 6 at a rate controlled by a rotary stop 10. For ease of illustration, the hopper 6 is shown on the opposite side of the former from the head, but in practice the hopper will be very close to the head 4 so that it can be reciprocated with the head. The powdered compound is retained by the sticky resin, and so is embodied throughout the body of the tube as winding continues until, when winding is completed, there is a proportion of the wear resistant compound substantially evenly distributed throughout the body of the material. The compound can give the tube a wear resistant surface and also a uniform composition throughout so that the tube can be machined, and even after machining a wear resistant surface is revealed.

The wear resistance can be at least twice that of resin-impregnated asbestos material, which has previously been used for such tubes. The bearing does not swell in the presence of water or oil, so that either (even sea water) can be used for lubrication in use, and can be satisfactorily machined.

Although the tube has been described as being wound cold, it would be possible to heat the mandrel before winding, and also to heat the outside of the mandrel as it is wound with an infra-red heater.

The polyacrylonitrile fibre described as being suitable for building up the tube, could be partially carbonised to form black Orlon by heating in air at between 160° and 300° C. prior to winding.

If a wear resistant bearing surface is required only on the inner cylindrical surface of the tube, then after a certain thickness, say ½ inch, has been wound on the mandrel, the wear resistant powder addition at 6 can be stopped. Alternatively, or in addition, the polyacrylonitrile yarn can be replaced by glass fibre, and a further thickness, say up to about another 1½ inches, can be wound around the lining already wound. Further lining without the wear resistant compound could consist of the same fibre and polyester resin.

Polyester and epoxy resins are preferred in the bath 7, because they can be used without solvents which tend to evaporate leaving a material which is too porous. For example, cresylic resins, which otherwise are quite satisfactory, tend to need solvents.

The various types of polyacrylonitrile yarn, known by the Trade Marks, "Courtelle, Acrilan and Orlon" do not absorb water, and are wear resistant and so are eminently suitable for forming this invention.

Although the winding is described as an overlapping wave winding, straight, overlapping or helical, or other forms of winding can be used, and the particular form of the winding is not critical to the invention.

EXAMPLE 1

In one example, polyacylonitrile yarn fibres, (Courtelle yarn 1.2 cotton count) were drawn through a bath 7 containing a terephthalic-acid based, unsaturated polyester resin in styrene (sold by ICI as Impolex T504) with methyl ethyl ketone peroxide hardener dissolved in it. The fibres picked up about an equal volume of resin.

The wet, resin-impregnated rovings were then wound on the mandrel 5 with a diameter of 500 m.m., rotating at 10 rev/min. A solid lubricant mixture in the form of a dry powder was continuously added to the fibre covered rotating mandrel, as shown at 6 in FIG. 2, at such a rate as to give a filler content of 10% by volume in the finished composite. The composition of this powder filler was: PTFE 60%, 200 mesh 89/11 Tin/Bronze powder 20%, graphite 20% (all % by volume).

When a 2 inch thick layer of the fibre, resin, and powder, composite had been wound onto the mandrel the tube was put aside overnight to set at ambient temperature (16° C.).

Next morning the mandrel was removed and the fibre-reinforced resin tube so produced was cured for one hour at 150° C. in an oven.

After curing the composite tube was machined to size.

The tube composition was: 45% resin by volume, 45% fibre, 6% PTFE, 2% graphite, and 2% tin/bronze.

EXAMPLE 2

A tube was wound onto a 500 mm mandrel in the same manner as described in Example 1, except that the impregnating resin was a mixture of an epoxide resin, an amine accelerator and an anhydride hardener (Shell Epekote 828 100 parts, NMA 90 parts, BDMA 2 parts). The same dry powder was added at 6 until the tube wall was ⅜ inch thick.

Then ⅜ inch was added to the tube thickness using glass fibres instead of polyacrylonitrile, with the same resin, but no dry powder. The mandrel and tube were left overnight to harden at normal temperature and then, after removing the mandrel, cured for one hour at 100° C. followed by six hours at 180° C.

The resulting tube was machined to form a stern tube bush, the first wound solid lubricant filled layer forming the bearing surface with the glass/epoxide outer layer providing strength and dimensional stability.

EXAMPLE 3

A tube was wound in the same manner as described in Example 1 except that the polyacrylonitrile fibres had been oxidised by heating in air at 160° C. rising to 300° C. over a two hour period.

The resin used in this case was Dow Corning vinyl ester resin Derakane 411-45. The rest of the process was as in Example 1.

EXAMPLE 4

A tube was wound as in EXAMPLE 1, the only change being the addition of 10% of 3 micron polishing alumina to the dry powder such that the final composite contained 1% by volume of alumina. In this case the solid filler was mixed into the resin into the impregnating bath instead of being added as a powder at the mandrel.

The fine alumina powder can protect the shaft in use without causing excessive wear, but helping the shaft to bed well in the bearing.

EXAMPLE 5

The wear resistant powder of Example 1 was included in the bath 7 with the resin of Example 1, in proportions by volume in the range 50:50–90:10 of powder to resin in the form of a smooth paste. The paste was pushed up by the polyacrylonitrile fibres in a proportion by volume in the range 60:40–40:60 for fibre to resin/powder mixture. Winding on the mandrel was as described in Example 1 except that no powder was added at the winding point.

I claim:

1. A method of forming a bearing tube from a plurality of polyacrylonitrile fibres, a sticky resin, and a wear resistant compound and using a forming mandrel, which comprises:
   treating said plurality of fibres with said sticky resin;
   winding said plurality of resin-treated fibres onto said mandrel so as to form an inner and an outer surface of said bearing tube;
   applying said wear resistant compound to said fibres immediately subsequent to said step of winding said fibres; and
   solidifying said sticky resin.

2. A method as claimed in claim 1, wherein said resin is selected from the group consisting of epoxide, phenolic, polyester, vinyl ester, and cresylic resin.

3. A method as claimed in claim 2, further including a bath containing said sticky resin wherein said treating step further comprises passing said plurality of fibres through said bath.

4. A method as claimed in claim 3, wherein said applying step further comprises applying said wear resistant compound to the surface of said plurality of resin-treated fibres immediately after said step of winding onto said mandrel.

5. A method as claimed in claim 1, wherein said wear resistant compound further comprises a powder.

6. A method as claimed in claim 5, wherein said wear resistant compound is selected from the group consisting of PTFE, graphite, bronze and mixtures thereof.

7. A method as claimed in claim 6, wherein said wear resistant compound comprises 50%–70% PTFE, 10%–30% graphite, and 10%–30% of bronze all by volume.

8. A method as claimed in claim 6 wherein said wear resistant compound comprises 50%–70% PTFE, 10%–30% graphite, and 10%–30% of tin/bronze all by volume.

* * * * *